(No Model.)
F. W. QUITMAN.
SELF LOCKING PULLEY.
No. 438,291. Patented Oct. 14, 1890.
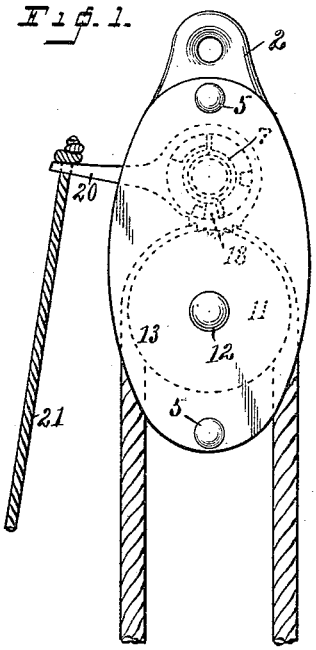
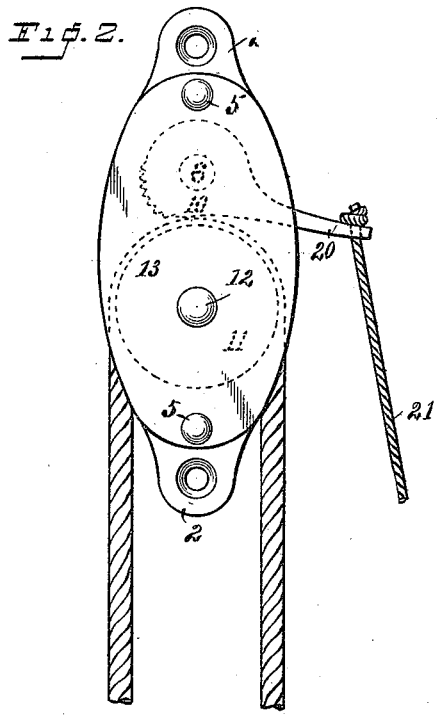
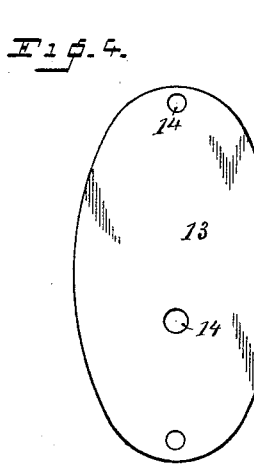
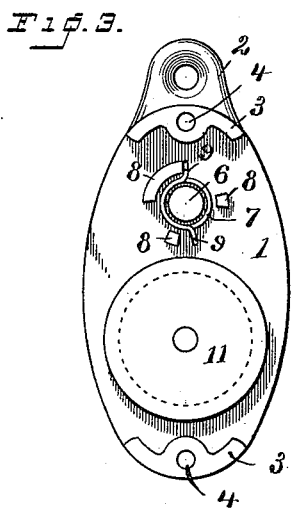
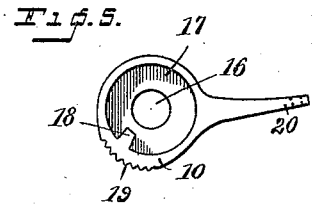
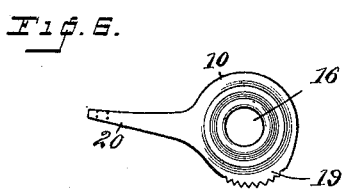
WITNESSES
C. M. Newman,
Arley I. Munson.
INVENTOR
Frederick W. Quitman
By A. M. Wooster
Atty.

UNITED STATES PATENT OFFICE.

FREDERICK W. QUITMAN, OF SOUTH NORWALK, CONNECTICUT.

SELF-LOCKING PULLEY.

SPECIFICATION forming part of Letters Patent No. 438,291, dated October 14, 1890.

Application filed May 5, 1890. Serial No. 350,559. (No model.)

*To all whom it may concern:*

Be it known that I, FREDERICK W. QUITMAN, a citizen of the United States, residing at South Norwalk, in the county of Fairfield and State of Connecticut, have invented certain new and useful Improvements in Self-Locking Pulleys; and I do hereby declare the following to be a full, clear, and exact description of the invention, such as will enable others skilled in the art to which it appertains to make and use the same.

My invention has for its object to produce a pulley of this class in which the number of parts shall be reduced to the minimum, and which shall be so constructed and arranged that the cost of construction shall be greatly reduced and the danger of breakage and getting out of repair under ordinary circumstances shall be wholly done away with.

With these ends in view I have devised the simple and novel construction which I will now describe, referring by numbers to the accompanying drawings, forming part of this specification, in which—

Figure 1 is an elevation of a hanging pulley embodying my present improvements, the pulley being what is termed a "right-handed pulley"—that is, the cord or rope moving toward the right; Fig. 2, a similar elevation of a fixed pulley embodying my present improvements, the rope in this instance moving toward the left; Fig. 3, a view of the form illustrated in Fig. 1 with the face-plate and spring locking-dog removed; Fig. 4, a view of the face-plate detached; and Figs. 5 and 6 are respectively inverted plan and plan views of the locking-dog detached.

The entire pulley consists of five parts only besides the rivets—to wit, the two plates which form the case, the sheave or wheel, the locking-dog, and the spring.

1 denotes the back plate of the case, which is provided with one or more ears 2 for hanging or for rigid attachment in position, as in either Figs. 1 or 2.

3 denotes studs at the ends of the plate, which are provided with holes 4 to receive the rivets 5, which hold the plates together.

6 denotes a stud, which acts as a support for the spring 7, and also as a pivot for the locking-dog 10 to turn on, and 8 denotes arc-shaped lugs, three being required in practice, all of which are equidistant from stud 6. The spring is an ordinary coil-spring, the two ends of the coil, which are denoted by 9, being turned outward, as clearly shown in Fig. 3, these ends being adapted to engage one of the lugs 8 and a lug on the locking-dog, as will presently be fully explained.

11 denotes a sheave or wheel, which is mounted on a rivet or pin 12, whose opposite ends are fixed in the two plates of the case.

13 denotes the face-plate, which is provided with holes 14 to receive rivets 5 and 12. These rivets may of course be blind or may be headed externally, as shown in Figs. 1 and 2.

15 denotes the cord or rope, which passes over the sheave in the usual manner, lying partially in the groove thereof.

The locking-dog 10 is provided with a central opening 16 to receive stud 6 and with a recess 17 in its under side, which receives and covers the spring and lugs 8.

18 denotes a lug on the under side of the locking-dog, which extends inward into recess 17.

Stud 6 does not pass through the face-plate, but is made of just sufficient height to rest thereon, the locking-dog being made of slightly less height than stud 6, so as to avoid friction between the locking-dog and face-plate, leaving the dog free to be turned on the stud by the power of the spring.

The locking-dog is provided on its lower outer face with a series of teeth 19, which are adapted to engage the rope or cord and clamp it tightly between the locking-dog and the sheave. The locking-dog is also provided with an outwardly-extending arm 20, to which the operating-cord 21 is attached.

In assembling, one of the ends 9 of the spring rests against one of the lugs 8, as shown in Fig. 3, the other end 9 of the spring lying at a distance from either of the other two lugs, but preferably nearer the lower one, as in Fig. 3. In assembling, the operating-dog is placed over stud 6, lugs 8, and the spring, lug 18 upon the under side of the operating-dog being placed between the lower end 9 of the spring and the lower lug 8, the position of said parts after assembling being dotted in Fig. 1. It will be seen that the action of the lower end 9 of the spring against lug 18 will be to move said lug downward until stopped by the lower lug 8, as indicated in Fig. 1. The effect of this will be to throw the locking-dog to the position indicated in Fig. 1—that is, the outwardly-extending arm will be thrown upward and the teeth will be moved downward into engagement with the rope or cord upon the sheave. The oscillation of the teeth of the operating-dog being from right to left, and the movement of the cord or rope upon the sheave being also toward the left, it follows that the greater the strain or pull upon the rope the more tightly it will be locked by the clamping action of the teeth—that is, it will be locked by being clamped between the teeth of the dog and the sheave. In order to unlock the rope, the operator simply has to pull down upon the operating-cord. This movement draws down arm 20, oscillates the locking-dog, and throws the teeth out of locking position, as indicated by dotted lines in Fig. 2. It will be seen that this movement leaves the rope or cord upon the sheave perfectly free, so that the pulley may be operated to raise or lower a weight so long as the locking-dog is held out of operative position by holding the operating-cord. The moment, however, that the operating-cord is released the spring will act to throw the parts to the position indicated in Fig. 1 and also in Fig. 3, and will lock the rope or cord tightly, as already explained, the effect being to hold the weight securely for any length of time and at any position at which it may be suspended.

As the lugs 8 are illustrated in Fig. 3, the upper lug acts as a rest for the upper end 9 of the spring, and the lower lug acts as a stop to limit the movement of the locking-dog toward the locking position, this stop being of course necessary to retain the parts at all times in operative position. The intermediate lug—that is, the one toward the right in Fig. 3—acts as a stop to limit the movement of the locking-dog when the arm is drawn downward by the operating-cord.

Having thus described my invention, I claim—

In a self-locking pulley, the combination, with the face-plate and the sheave, of a back plate having a stud 6 and lugs 8, a spring surrounding the stud and having outwardly-extending arms engaging the lugs, and an oscillating locking-dog which engages the stud and is provided in its under side with a recess, which incloses the spring and lugs 8, and with a lug 18, adapted to be engaged by one end of the spring, said locking-dog having on its outer face teeth adapted to engage the rope on the sheave when the dog is oscillated by the spring, and an arm whereby the dog is oscillated in the opposite direction to release the rope.

In testimony whereof I affix my signature in presence of two witnesses.

FREDERICK W. QUITMAN.

Witnesses:
A. M. WOOSTER,
ARLEY I. MUNSON.